United States Patent [19]
Virtue et al.

[11] Patent Number: 5,208,875
[45] Date of Patent: May 4, 1993

[54] DIGITAL PICTURE SIGNAL PROCESSING APPARATUS

[75] Inventors: Peter J. Virtue, Basingstoke; Stephen M. Keating, Abbots Barton; David J. Hedley, Abbots Barton, all of England

[73] Assignee: Sony Corporation, Tokyo, Japan

[21] Appl. No.: 883,044

[22] Filed: May 7, 1992

Related U.S. Application Data

[63] Continuation of Ser. No. 482,045, Feb. 20, 1990, abandoned.

[30] Foreign Application Priority Data

Mar. 7, 1989 [GB] United Kingdom ............. 8905185

[51] Int. Cl.$^5$ ............................................. G06K 9/36
[52] U.S. Cl. ..................................... 382/54; 382/27; 382/41; 358/160
[58] Field of Search ................. 382/54, 41, 50, 44, 382/27; 358/160, 454, 457, 459; 340/798

[56] References Cited

U.S. PATENT DOCUMENTS

| | | | |
|---|---|---|---|
| 4,240,113 | 12/1980 | Michael et al. | 358/180 |
| 4,437,121 | 3/1984 | Taylor et al. | 358/160 |
| 4,454,590 | 6/1984 | Belt et al. | 364/724 |
| 4,742,399 | 5/1988 | Kitamura | 382/27 |
| 4,766,496 | 8/1988 | Hedley et al. | 358/160 |
| 4,847,691 | 7/1989 | Barton et al. | 358/160 |

FOREIGN PATENT DOCUMENTS

| | | |
|---|---|---|
| 85210 | 8/1983 | European Pat. Off. . |
| 314250 | 5/1989 | European Pat. Off. . |
| 2180378 | 3/1987 | United Kingdom . |

OTHER PUBLICATIONS

Patent Abstracts of Japan, vol. 10, No. 154 (P-463) (2210) Jun. 4, 1986 & JP-A-61006771 (Matsushita) Jan. 1986.

Primary Examiner—Michael T. Razavi
Assistant Examiner—Yon Tung
Attorney, Agent, or Firm—Alvin Sinderbrand; William S. Frommer

[57] ABSTRACT

A digital picture signal processing apparatus has memories each capable of storing digital words representing respective pixels which, when arranged in a two-dimensional array, make up a picture. A read address generator produces a digital read address identifying the position of a set of the stored words to be read from respective different ones of the memories, the words of the set representing a set of pixels so positioned relative to one another as to constitute at least some of the pixels of a portion of the picture. The read address comprises at least one least significant bit (LSB) for each of the coordinate directions. A digital filter has a number of multipliers equal to the number of words in the set and each being connected to a data bus of a respective memory so as to receive a respective one of the set of words read therefrom, and a plurality of coefficient memories. Each coefficient memory is connected to a respective one of the multipliers and stores all of a plurality of weighting coefficients each appropriate to the position of a respective one of the set of pixels in the picture portion. Each coefficient memory is responsive to the values of the LSBs and to identification of the memory whose data bus is connected to the associated multiplier to supply to that multiplier that one of the coefficients stored therein appropriate to the position in the picture portion of the pixel represented by the word supplied to that multiplier.

9 Claims, 5 Drawing Sheets

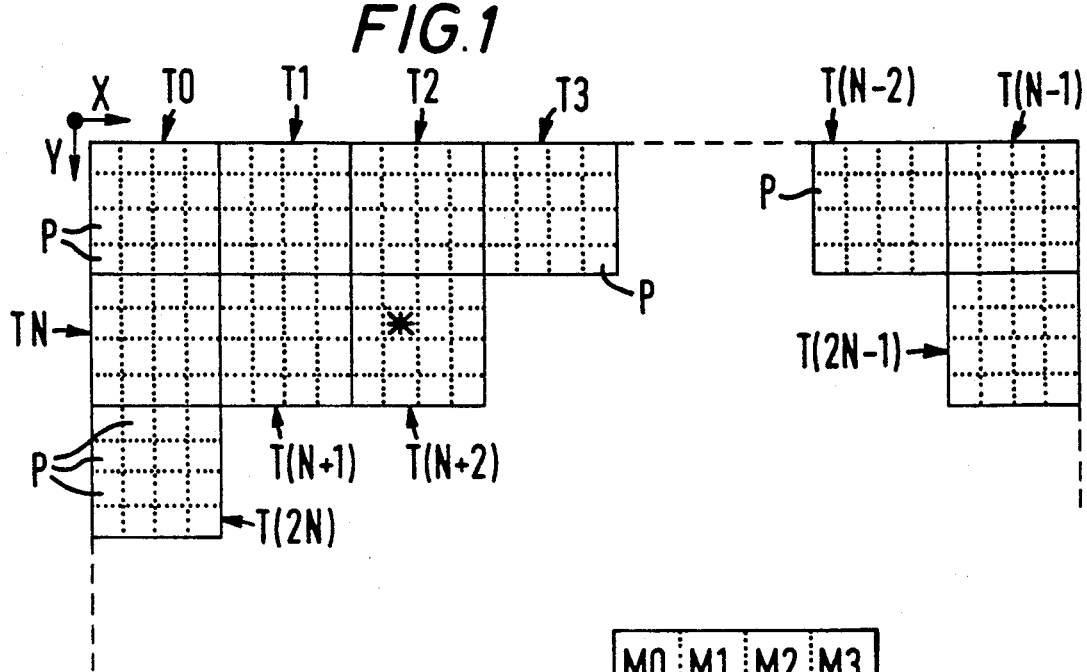
FIG.1
FIG.2
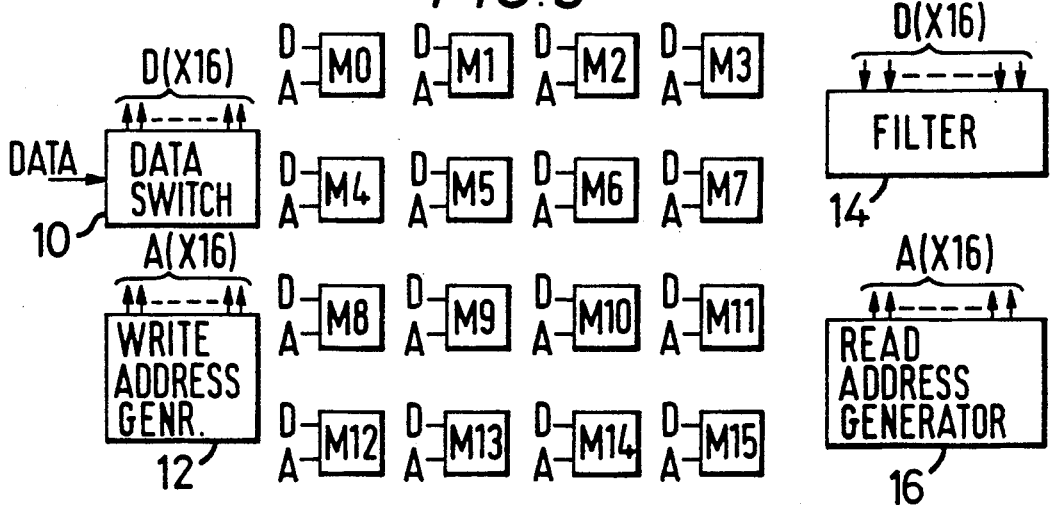
FIG.3

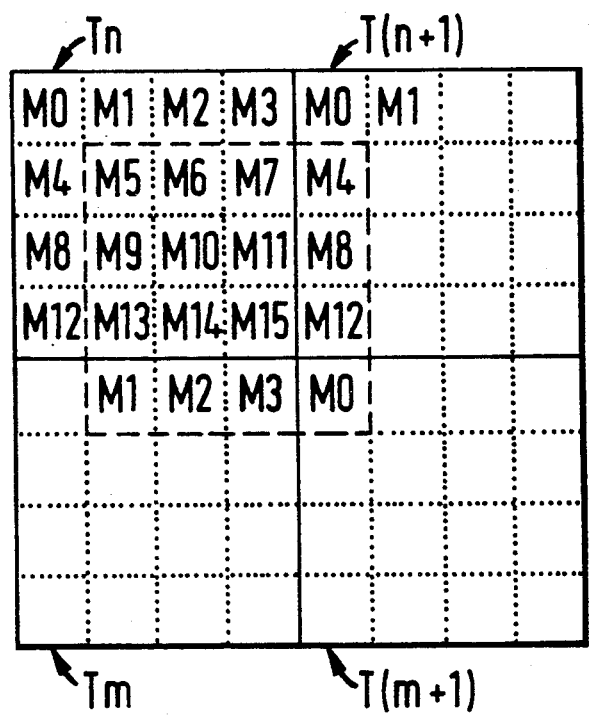
FIG.4
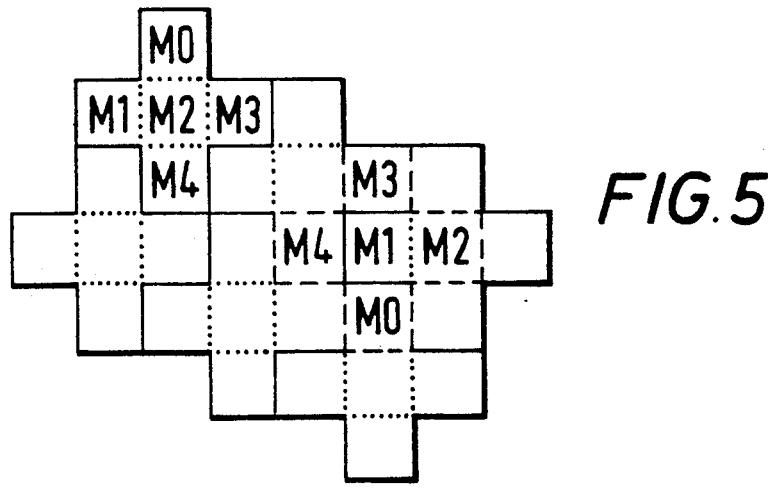
FIG.5
FIG.7
FIG.6
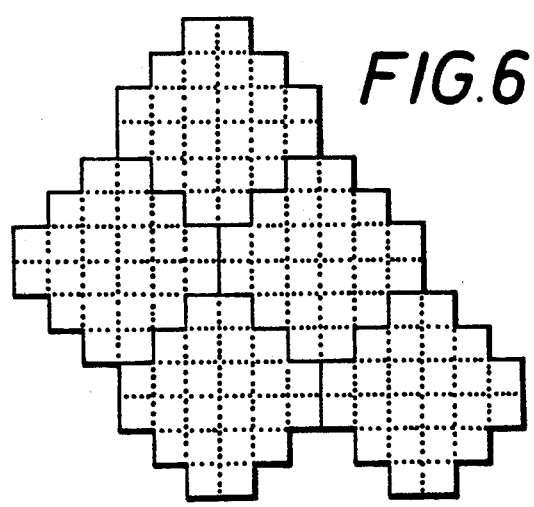

DIGITAL PICTURE SIGNAL PROCESSING APPARATUS

This application is a continuation of application Ser. No. 07/482,045, filed Feb. 20, 1990, now abandoned.

CROSS REFERENCE TO RELATED APPLICATION

Our copending U.S. patent application Ser. No. 07/482,050, which claims priority from UK Patent Application No. 8095183.3 and was filed on Feb. 20, 1991, includes claims directed to a method, as disclosed hereinbelow, for obtaining access to a two-dimensional part of a digital picture signal.

BACKGROUND OF THE INVENTION

1. Field of the Invention

This invention relates to digital signal processing apparatus.

2. Description of the Prior Art

It is of course well known to produce a digital picture signal comprising a plurality of digital words representing respective pixels (picture elements) which, when arranged in a two-dimensional array, make up the picture. Such a signal may, for example, be a digital video signal obtained by sampling an analog video signal and digitizing the samples, by pulse code modulation, to form digital words, for instance 8-bit words. There are, however, other applications in which digital picture signals may be formed, for example in digital storage of image information and character recognition.

It is also well known to store digital picture signals. For example, digital video effects (DVE) equipment will often store one or more fields or frames of a digital video signal in order that the picture may be processed or manipulated to achieve a desired effect.

In modern picture processing techniques, and in particular (but not exclusively) in DVE equipment, access to a two-dimensional (2-D) portion of a stored digital picture signal often is required. The portion usually is of a fixed size and may be located at any position within the picture. For instance, it may be desired to process an array of pixels in a fixed function digital filter, in which an array of pixels are combined with predetermined weightings to produce an output pixel, or in an interpolating digital filter in which an array of pixels surrounding an output pixel position not coincident with the position of a stored pixel are combined with predetermined weightings to produce an interpolated output pixel to sub-pixel accuracy.

Naturally, whatever the application, it is desirable that access to the stored digital words representing the pixels be achieved in as fast a manner as possible, in order to maximize the processing speed. To this end, it is highly desirable that the stored words representing the desired pixels be accessible in parallel. Such parallel access not only enables fast processing, but enables the processing to be achieved in a pipelined manner in that sets of words can be fed into a filter (for example) in parallel whereby an output from the filter will arrive after a predetermined delay.

Our above-cited copending U.S. patent application Ser. No. 07/482,050 discloses a method of obtaining access to a two-dimensional portion of a digital picture signal. The method enables parallel access to be achieved. However, it poses a difficulty in the construction of a digital filter. Specifically, as described in more detail below, it involves storage of digital words in a plurality of memory devices in such a way that there is a plurality of possible relationships between the words of a set of words read from respective different ones of the memory devices and the respective memory devices in which they are stored.

An object of the present invention is to enable the above-mentioned difficulty to be overcome, that is to solve the problem of constructing a digital filter that will take account of the fact that there is a plurality of possible relationships between the stored words and the devices in which they are stored.

SUMMARY OF THE INVENTION

The invention provides a digital picture signal processing apparatus comprising a plurality of memory devices each having a respective data bus and each capable of storing a plurality of digital words representing respective pixels which, when arranged in a two-dimensional array, make up a picture. The apparatus also comprises a read address generator operative to produce a digital read address identifying, in terms of positions along two orthogonal picture coordinate directions, the position of a set of the stored words to be read from respective different ones of the memory devices, the words of the set representing a set of pixels so positioned relative to one another as to constitute at least some of the pixels of a two-dimensional portion of the picture, the read address comprising at least one least significant bit for each of the coordinate directions, the values of the least significant bits indicating, in combination, which one of a plurality of possible relationships between the words of said set and the respective memory devices in which they are stored holds true. Further, the apparatus comprises a digital filter having a plurality of multipliers equal in number to the number of words in said set, each multiplier being connected to the data bus of a respective one of the memory devices so as to receive a respective one of the set of words read therefrom, and a plurality of coefficient memories each connected to a respective one of the multipliers, each of the coefficient memories storing all of a plurality of weighting coefficients each appropriate to the position of a respective one of said set of pixels in said two-dimensional portion of the picture and each one of the coefficient memories being responsive to the values of said least significant bits and to identification of the memory device whose data bus is connected to the associated multiplier to supply to the associated multiplier that one of the plurality of weighting coefficients stored therein that is appropriate to the position in said two-dimensional portion of the picture of the pixel represented by the word supplied to the associated multiplier.

As explained in more detail below, the foregoing apparatus enables the above-described difficulty to be overcome in that it insures that, in all cases, each word fed to each multiplier of the filter is weighted by the correct coefficient.

BRIEF DESCRIPTION OF THE DRAWINGS

The above and other objects, features and advantages of the invention will be apparent from the following detailed description of illustrative embodiments, which is to be read in conjunction with the accompanying drawings, in which:

FIG. 1 represents part of a picture and shows how it may be divided into pixels and how the pixels may be grouped together into tessellating areas of like size and shape (square in the case of FIG. 1), which areas are referred to herein as "tiles";

FIG. 2 shows one of the tiles on an enlarged scale;

FIG. 3 shows apparatus for storing a digital signal representing the picture;

FIG. 4 shows four adjacent ones of the tiles on an enlarged scale and is used to describe reading of the stored digital signal;

FIG. 5 is a view corresponding to part of FIG. 1, showing the pixels grouped into tessellating areas in the shape of crosses;

FIG. 6 is a view corresponding to part of FIG. 1, showing the pixels grouped into tessellating areas in the shape of hexagons;

FIG. 7 shows an array of pixels for which the words representing same are to be read from the storage apparatus and applied to a filter;

DESCRIPTION OF THE PREFERRED EMBODIMENTS

Figure 8:
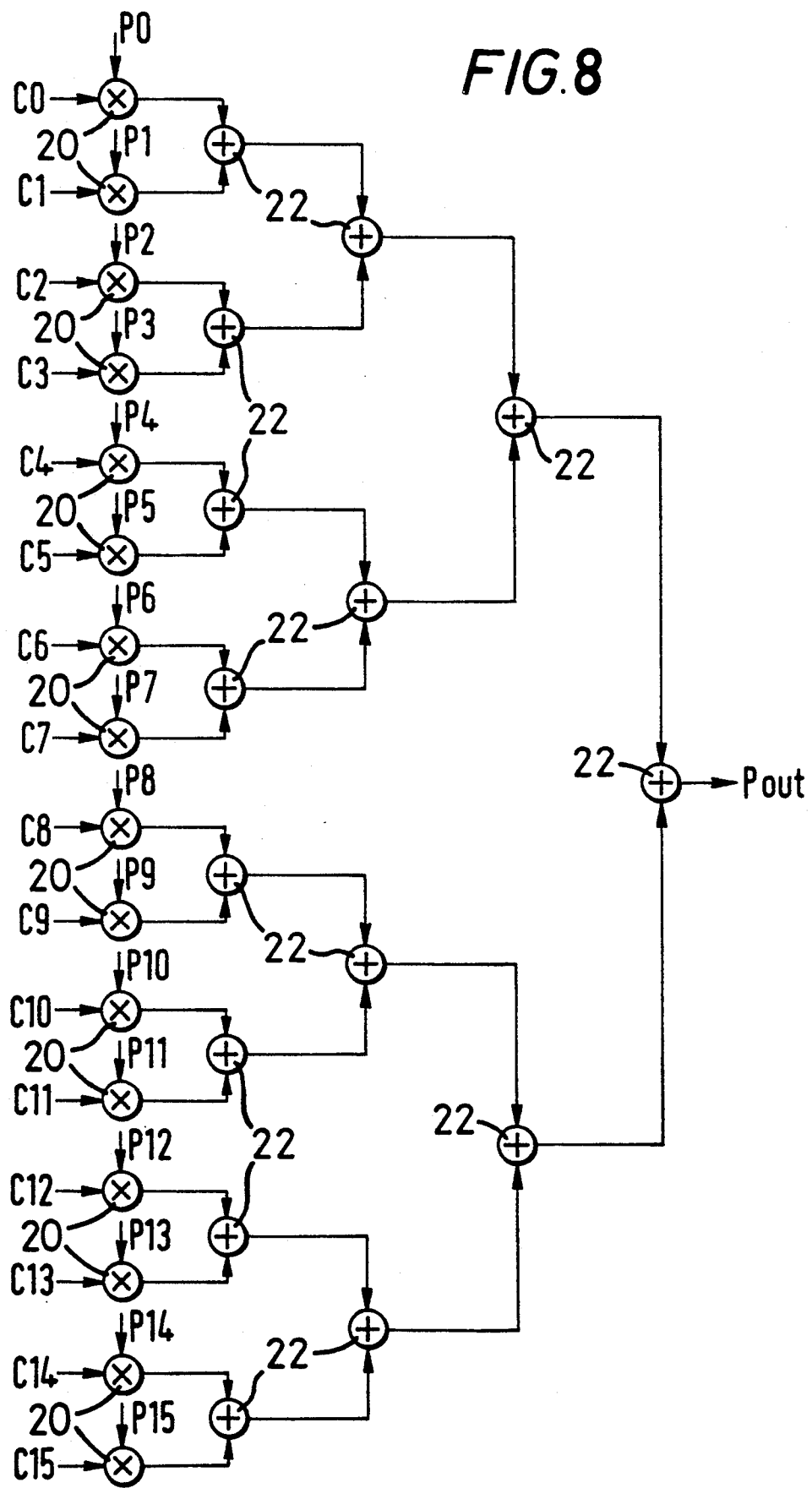
FIG. 8 shows how, in principle, the filter may be constructed.

FIG. 1 of the drawings shows part of a picture. The picture can be considered to comprise a two-dimensional (2-D) array of pixels (picture cells or elements) P, the boundaries of which are represented in FIG. 1 by dotted lines. The picture can, for example, be that represented by a field of a video signal. If, for instance, the video signal is a high definition television (HDTV) signal, namely a 1025 line video signal having an aspect ratio of 5:3, the number of pixels will be 500 (in the vertical direction) times 1920 (in the horizontal direction), namely 960,000. For convenience, the picture will be hereinafter described for the case in which it is a picture represented by a field of a video signal, though it should be appreciated that the technique for storage and reading (access) described below is applicable to other pictures.

The picture is converted into a picture signal, and thereafter stored, by: sampling it in the centre of each pixel, along successive horizontal picture scanning lines, whereby each sample corresponds to a pixel; digitizing each sample by pulse code modulation to form a digital word or byte (e.g. an 8-bit word) representing the pixel; and storing the words in respective memory addresses.

Prior to storage, the words are allocated or notionally divided into groups such that the pixels represented by the words of each group make up a 2-D area of the picture having a shape and size which is the same for all of the groups, the shape being such that the areas of the same shape and size (which areas are hereinafter also referred to as "tiles") tessellate with one another to constitute at least part of (or, preferably all of) the picture. In the case of FIG. 1, the tiles (which are designated T0, T1 etc and have boundaries shown by solid lines) are square in shape and their size is 4 pixels by 4 pixels, whereby each tile comprises 16 pixels. However, the size and shape of the tiles is immaterial provided that they are all of the same size and shape and the shape is capable of tessellation.

The words representing the pixels are stored in a plurality of physically separate memory devices, such as random access memory devices (RAMs), the number of which devices is equal to the number of pixels in each tile. Thus, in the case of the example of FIG. 1, 16 memory devices are employed. Further, the pixels are so stored in the memory devices that, for each pixel position in each tile, the words from all of the tiles representing the pixels having that pixel position in the tile are stored in a respective one of the memory devices. Thus, in the case of FIG. 1, where 16 memory devices (which are designated M0 to M15) are employed for storage, the words are stored as indicated schematically in FIG. 2. That is to say, the top left hand words in all of the tiles making up the picture are stored in respective addresses in the memory device M0; the pixels to the right thereof in all of the tiles are stored in respective addresses in the memory device M1; and so on. In other words, each pixel location in all of the tiles is associated with a respective one of the memory devices.

The storage capacity of each of the memory devices M0 to M15 must of course be equal to or greater than the total number of pixels in the picture divided by the number of pixels in each tile. Thus, pursuing the above example of storage of an HDTV field, the storage capacity of each of the memory devices M0 to M15 must be no less than 960,000/16=60,000 words. Thus, for example, RAMs having a storage capacity of 64 KB could be used.

The operation of writing the picture signal to the memory devices (hereinafter also referred to, for brevity, as "memories") will now be described with reference to FIG. 3. The memories M0 to M15 (which may for example comprise sixteen 64 KB RAMs mounted on one or more circuit boards) are each provided with a respective data bus D and a respective address bus A. The 16 data busses D are connected to respective outputs of a data switch 10 and the 16 address busses A are connected to respective outputs of a write address generator 12. Data, in the form of a sequence of words obtained by sampling an analog video signal and digitizing the samples by pulse code modulation to form the words, is supplied to an input of the data switch 10. The data switch 10 switches each word to the data bus D of a respective one of the memories M0 to M15, and the write address generator 12 applies address signals to the address busses A of the respective memories, such that the words become stored in the memories in the manner described above. Thus, referring to the top line of pixels in FIG. 1, which upon sampling and digitization will become the words of the first picture line of the video signal, the first four words (in the tile T0) will be switched to the memories M0 to M3, respectively, and will be stored at 0th addresses therein. The next four words (in the tile T1) also will be stored in the memories M0 to M3, respectively, at 1st addresses therein. This process continues for the whole of the first picture line, the last four words (in the tile T(N−1)) being stored in the memories M0 to M3, respectively, at (N−1)th addresses therein.

In the next picture line (still in the tiles T0 to T(N−1)) the words are stored in the same manner, but this time in the memories M4 to M7. Similarly, in the third and fourth picture lines, the words are stored in the same manner, but this time in the memories M8 to M11 (third line) and M12 to M15 (fourth line). In the fifth picture line, the words are again stored in the memories M0 to M3, in this case at Nth to (2N−1)th addresses therein. This process continues for the picture lines of a whole field of the video signal until the entire field is stored in the memories M0 to M15. Each word is stored in a respective one of the memories M0 to M15 dictated by the position in a tile of the pixel that it represents, and the address of each word in its respective memory is the number (i.e. the location) of the tile containing the pixel representing the word.

In modern picture processing techniques, for example (but not exclusively) in digital video effects (DVE) equipment, it is often necessary to obtain access to a 2-D portion of the picture. For instance, it may be desired to process a set of stored words, representing an array of pixels making up a 2-D portion of the picture, in a fixed function filter, in which the stored words are combined with predetermined weightings to produce an output word, or in an interpolating filter in which a set of stored words representing an array of pixels making up a 2-D portion of the picture surrounding an output pixel position not coincident with any of the pixel positions represented by the stored words are combined with predetermined weightings to produce an interpolated output pixel to sub-pixel accuracy.

For example, take the case in which access to (reading of) a 4×4 pixel array (making up a 2-D picture portion of the same shape and size as the picture tiles) is needed. What this might involve is as follows. Firstly, access to all of the words representing the pixels in the tile T0 is needed. Next, after moving the access or reading array one step to the right, access is needed to the three columns of pixels on the right in the tile T0 and to the left-most column of pixels in the tile T1. Next, after another step to the right, access is needed to the pixels in the right hand half of the tile T0 and to the pixels in the left hand half of the tile T1; and so on down the first row (T0 to T(N−1) of tiles. Thus, in most cases, access is needed to pixels in two tiles.

Then, the reading or access array is stepped down by one pixel and the operation is repeated, whereby this time access is needed, in most cases, to pixels within four tiles.

As this process is repeated line by line, it will be appreciated that, in most cases, over the picture as a whole, access will be needed to pixels within four tiles. That is, the reading array, while of the same size and shape as the picture tiles, does not in most cases coincide with a picture tile. More precisely, the reading array will coincide with a tile in only one of the sixteen possible locations of the reading array with respect to the tile boundaries.

It will be appreciated that, when a stored picture is processed in the above manner, it is highly desirable that it be possible to read all the words in the reading array in parallel. This will speed up the process performed by the filter or other equipment supplied with the reading array and enable the process to be performed in a pipelined manner in that sets of words can be fed into the filter or other equipment in parallel whereby an output from the filter or other equipment will arrive after a predetermined delay. In general, parallel access to the words of the reading array is difficult or impossible. However, as will now be explained, the form of memory architecture described above with reference to FIGS. 1 to 3 in fact enables parallel access to be achieved.

As explained above, while the reading array is of the same shape and size as the picture tiles T0, T1 etc, it generally does not coincide with a picture tile during the reading process. An example of this is shown in FIG. 4. FIG. 4 shows four adjacent tiles Tn, T(n+1), Tm and T(m+1) located at an arbitrary position in the picture. Suppose that, at a particular time, access is needed to the stored words representing the 2-D picture portion defined by the 4×4 array of pixels bounded by the dashed line in FIG. 4. As will be seen, the picture portion to be read overlaps all four tiles. However, as will also be seen, due to the fact that the picture portion to be read is of the same shape and size as the tessellating picture tiles (or, more precisely, is of such a shape and size that it has a boundary that will fall within that of the picture tiles), and because the words in each tile corresponding to each position are stored in a unique one of the memories M0 to M15, the reading array corresponding to the picture portion does not require access to more than one word in any one of the memories. In fact, it requires access to one word only in each of the memories M0 to M15 whereby the entire array can be read in parallel by simultaneously addressing a single location in each of the memories (via their respective data and address busses D and A). Thus, in the specific example shown in FIG. 4 (recalling that the address of each word in its respective memory is the number or location in the picture of the tile containing the pixel representing that word) the array is read by reading the words having the address n in the memories M5, M6, M7, M9, M10, M11, M13, M14 and M15, the words having the address (n+1) in the memories M4, M8 and M12, the words having the address m in the memories M1, M2 and M3, and the word having the address (m+1) in the memory M0. As can be ascertained by inspecting FIG. 4 with the position of the reading array (the boundary of which, as mentioned above, is shown by dashed lines) changed so that it occupies any other of the fifteen possible locations in which the pixel positions therein span two or more of the tiles Tn, T(n+1), Tm and T(m+1), in all cases the reading array will require access to only one of the addresses in each of the memories M0 to M15 whereby the entire array can, in the case of all sixteen possible dispositions of the reading array with respect to the tile boundaries, be read in parallel by simultaneously addressing a single location in each of the memories (via their respective read and address busses D and A).

In the foregoing example, the reading or access array was of the same size and shape as the picture tiles (and thus comprised the same number of pixels as the number of memories). While this usually will be the case, parallel access will be obtainable if the shape and size of the reading array are such that it has a boundary that falls within that of the picture tile. Thus, it is not necessary to read all of the words in an array that is the same size and shape as the picture tiles. For example, in the above-described example, parallel access would still be obtainable if only some of the words representing the pixels within the 4×4 access array were read, for example words representing mutually spaced selected ones of the pixels or words representing adjacent ones of the pixels that make up a 2-D section of the picture (e.g. a 2×2 or 3×3 array) that falls wholly within a 4×4 array.

As indicated above, although in the foregoing example the picture tiles are square, the size and shape of the tiles is immaterial provided they are all of the same shape and size and the shape is capable of tessellation. For example, it is possible to employ cross-shaped tiles (such as the 5-pixel crosses shown in FIG. 5) or polygonal tiles (such as the 24-pixel hexagons shown in FIG. 6). Also, clearly, a rectangular shape can be used. In all cases, the condition that the reading array requires access only to one address location in each of the memories can be met. This can be seen, for example, from an inspection of FIG. 5, which employs cross-shaped tiles having five pixels whereby five memories M0 to M4 will be employed (as shown on the uppermost tile in FIG. 5). Thus, the cross-shaped reading array bounded in FIG. 5 by dashed lines can be read by reading the memories M3 and M4 at the address of one of the tiles, the memories M1 and M2 at the address of a second tile, and the memory M0 at the address of a third tile.

The way in which words stored in the memories M0 to M15 are read to a filter will now be described in more detail. The filter, shown at 14 in FIG. 3, has 16 inputs each connected to the data bus D of a respective one of the memories M0 to M15. Reading of stored words via the data busses D to the filter 14 is controlled by a read address generator 16, which may form part of digital video effects (DVE) equipment and which has 16 outputs each connected to the address bus A of a respective one of the memories M0 to M15. For each clock cycle of the filter 14, that is each time the array of 16 words that it reads is stepped with respect to the stored picture as described above, the read address generator 16 generates a digital read address that represents the location of the reading array in the picture. More specifically, the read address represents the location in the picture of a reference one of the pixels of the reading array in terms of X and Y coordinates in a coordinate system in which the origin is the top left hand corner in FIG. 1, the X coordinate is the number of pixels (e.g. 1 to 1920 in the above example of the stored picture being a field of an HDTV signal) in the direction extending to the right from the origin, and the Y coordinate is the number of pixels (e.g. 1 to 500 in the same example) in the direction extending downwardly from the origin.

The reading array is represented in FIG. 7. As explained above, it is, as shown, preferably of the same shape and size as the picture tiles, being (in the present example) a 4×4 array of words representing pixels P0 to P15, where P0 to P15 may be any 4×4 array of pixels within the picture. The above-mentioned reference pixel may be any predetermined one of the pixels P0 to P15. Were the array uneven (e.g. a 5×5 array) it would be convenient for the reference pixel to be the centre pixel. Since, in an even array, there is no central pixel, it is convenient to select one near the centre, for example the pixel P5, to be the reference pixel. Thus, for each clock cycle of the filter 14, the read address generated by the read address generator 16 represents the X and Y coordinates of that pixel within the picture that is to have, during that cycle, the position in the reading array of the pixel P5. The read address generator 16 uses the signal X, Y to address the appropriate one of the memories M0 to M15, via its address bus A, to cause the word representing the pixel P5 to be passed to the filter 14 via the data bus D of that memory. Since the location of each of the other pixels P0 to P4 and P6 to P15 of the reading array has a predetermined offset in the X and Y directions from the location of the reference pixel P5, the read address generator 16 readily can calculate the addresses for the words representing them from that of the reference pixel whereby all of the words representing the pixels P0 to P15 can be addressed simultaneously and sent simultaneously from the respective memories M0 to M15, via their respective data buses D, to the filter 14 for processing in parallel.

As was explained above, each word is stored in a respective one of the memories M0 to M15 dictated by its position within a picture tile, and the address of each word in its respective memory is the number (i.e. the location within the picture) of the tile containing the pixel representing that word. At first sight, therefore, it might be thought that the read address generator has to perform a complex translation operation between the X, Y read address and the memory number and address number. However, as will now be explained, that is not the case: the X, Y read address in fact comprises that information. In this regard, the X, Y read address is a digital signal comprising a number of bits representing, in binary form, the X coordinate location (e.g. 1 to 1920 in decimal form) and a number of bits representing, in binary form, the Y coordinate location (e.g. 1 to 500 decimal form). If the decimal form X and Y coordinate locations are subjected to modulo division by the number of pixels in the X direction in each tile (4 in the present example) and by the number of pixels in the Y direction in each tile (also 4 in the present example), respectively, the integer results give the tile number (i.e. the location of the tile in the picture) and therefore the address within a memory, and the remainders identify the memory. Accordingly, in the actual binary signal, the least or lesser significant bits (LSBs)—which correspond to the remainders—identify the memory, and the more significant bits (MSBs)—which correspond to the integer results—identify the address within that memory. The number of LSBs that identify the memory depend upon the dimensions of the picture tile in the X and Y directions. In the present example, where these dimensions are each equal to four, the two least significant bits of each of the X and Y components of the read address signal therefore identify uniquely, in combination, the appropriate one of the memories and the remaining (more significant) bits indicate the address within that memory.

The foregoing may more readily be comprehended by an example. Take the case of the pixel denoted in FIG. 1 by an asterisk (*). It can be seen from FIG. 1 that the pixel is stored in the memory dedicated to that word within any tile which is two pixels down and two pixels along, namely the memory M5 (see FIG. 2); and that the pixel is located in tile number T(N+2), namely the tile which is the third along and the second down in the picture.

It can be seen also that, in decimal form, the coordinates of the pixel are X'10 and Y=6. Subjecting these to modulo division by four gives:

X=2 remainder 2; and

Y=1 remainder 2.

The remainders (LSBs in binary form) confirm that the memory employed is that dedicated to the pixel position that is two along and two down in the tile, namely the memory M5. The integer results (MSBs in binary form) identify the tile number in that the Y result indicates the multiple of N (the position in the Y direction) and the X result indicates the number to be added to the multiple of N (the position in the X direction); that is they identify the tile number T(N+2).

Thus, it will be appreciated that the generation by the read address generator 16 of the X and Y coordinates of a reference one of the pixels of the array of pixels to be read enables the generator without difficulty to address the memories M0 to M15 correctly to cause the correct words to be supplied to the filter 14.

FIG. 8 shows how in principle the filter 14 may be constructed. In a manner known per se, the filter 14 comprises a multiplier-adder "tree" constituted by sixteen multipliers 20 (one for each of the pixels P0 to P15 in the reading array) and an array of adders 22 connected to add together the results of multiplication operations carried out in the multipliers 20 to produce, from the sixteen input pixels P0 to P15, an output pixel Pout. In the multipliers 20, again as known per se, each of the words representing the pixels P0 to P15 is multiplied by a respective one of sixteen weighting coefficients C0 to C15. Each of the coefficients C0 to C15 is associated with the position within the reading array of a respective one of the pixels P0 to P15. That is to say, the value of each of the coefficients C0 to C15 is calculated (at the design stage) in accordance with the position of an associated one of the pixels P0 to P15 so as to weight the pixel in accordance with a desired 2-D positional relationship, for example a Gaussian distribution function circularly symmetrical about the centre of the reading array as shown in FIG. 7, to produce a desired filter characteristic. Thus, for proper operation of the filter, it is essential that each of the words representing the pixels P0 to P15 be multiplied by the respective one of the coefficients C0 to C15 associated with the particular position of that pixel within the reading array. This presents a problem when it comes to practical implementation of the filter, the nature of the problem being as follows.

The words corresponding to the pixels P0 to P15 are fed to the multipliers via the data busses D of the memories M0 to M15. If each one of the data busses D were connected to a respective one of the multipliers 20, the filter would not operate correctly because the above-described correspondence between the weighting coefficients C0 to C15 and pixel positions P0 to P15 would not be achieved. This is because, as explained above with reference to FIG. 4, the correspondence between the positions of the pixels P0 to P15 of the reading array and the memories M0 to M15 in which the words representing the pixels are located will vary, there being 16 possible relationships between the positions of the pixels of the reading array and the memories in which the words representing the pixels are located. That is, for example, in the case of the reading array bounded by dashed lines in FIG. 4, the word representing the pixel in (for instance) the top left hand corner of the array, namely the word representing the pixel P0 (see FIG. 7) is located in the memory M5. However, in other clock cycles of the filter, the same word might be found in any other one of the memories M0 to M15. That is, if each one of the data busses D were connected to a respective one of the multipliers there would be a correspondence between the weighting coefficients C0 to C15 and respective ones of the memories M0 to M15. But this would cause the filter to operate wrongly, because what is required is a correspondence between the coefficients C0 to C15 and the pixels P0 to P15 and the word corresponding to each of the pixels P0 to P15 will in fact be stored in different ones of the memories M0 to M15 in different clock cycles.

Figure 9:
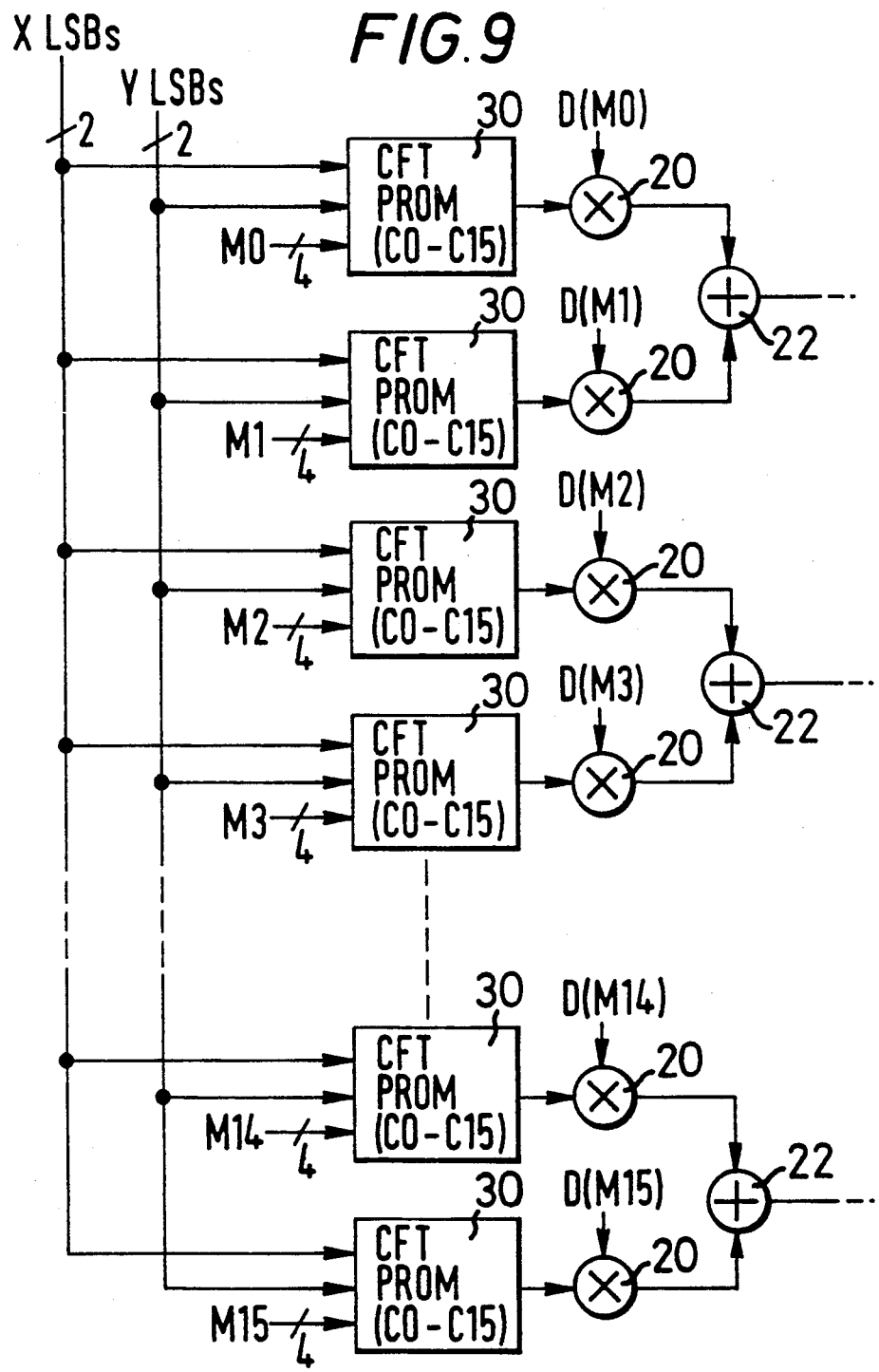
FIG. 9 shows a practical form of implementation of the filter.

A practical form of implementing the filter 14, which solves the above problem, is shown in FIG. 9. The filter of FIG. 9 is of the same structure as that of FIG. 8 except in so far as is described below. Consequently, for clarity, only some of the adders 22 are shown.

In the filter of FIG. 9, each of the sixteen multipliers 20 (only some of which are shown) is connected as shown to a respective one of the data busses (designated D(M0) etc.) of the respective memories M0 to M15. Also, each of the sixteen multipliers 20 is connected as shown to an output of a respective one of sixteen identical coefficient programmable read only memories (PROMs) 30, only some of which are shown. A first input of each of the coefficient PROMs 30 is connected to receive the above-mentioned X LSBs of the read address of the reference pixel P5 of the reading array shown in FIG. 7 and a second input of each of the PROMs is connected to receive the Y LSBs of the read address. As explained above, for the present example in which the length and height (i.e. the dimensions in the X and Y directions, respectively) of the reading array are each four pixels, there are two X LSBs and two Y LSBs. A third input of each of the PROMs 30 is connected to receive a predetermined (and invariant) group of bits, different for each of the PROMs, that identifies that respective one of the memories M0 to M15 having the data bus D(M0) to D(M15) connected to the multiplier 20 connected to that PROM. In that, in the present example, there are sixteen memories (M0 to M15), the group of bits comprises four bits. Thus, a total of eight bits (four the same for all of the PROMs 30 but differing for each filter clock cycle and the other four different as between each PROM, but remaining constant during all filter clock cycles) is inputted to each of the PROMs 30.

As explained above, the X and Y LSBs identify that one of the memories M0 to M15 in which, during each filter clock cycle, the word representing the reference pixel P5 of the reading array (the array of words to be supplied in parallel to the filter during the clock cycle) is located. That is, bearing in mind that, for each memory in which the reference pixel P5 is located, the memories in which the other pixels P0 to P4 and P6 to P15 are located is known, the values of the X and Y LSBs at any one time indicate which one of the sixteen possible relationships between the words representing the pixels P0 to P15 of the reading array and the respective ones of the memories M0 to M15 in which they are stored presently holds true. Therefore, in that the memory-identifying signal fed to the third input of each PROM 30 identifies the particular memory to which the multiplier 20 associated with that PROM is connected, that is it identifies the position within a picture tile of the word presenting the pixel being read to that multiplier, the totality of the bit information fed to the first to third inputs of each PROM during any one clock cycle indicates uniquely the position within the reading array (FIG. 7) of the pixel represented by the word being supplied from memory to the multiplier associated with that PROM; and therefore indicates which of the sixteen coefficients C0 to C15 should be supplied to that multiplier during that clock cycle. All of the coefficients C0 to C15 are stored in each of the PROMs 30 in the form of look-up tables and each PROM is responsive, during each clock cycle, to the above-mentioned totality of bit information supplied to its inputs, to apply the appropriate one of the weighting coefficients C0 to C15 to its associated multiplier 20 during each clock cycle. Thus, the desired correspondence between the weighting coefficients C0 to C15 and the positions of the pixels P0 to P15 of the reading array will always be achieved.

Figure 10:
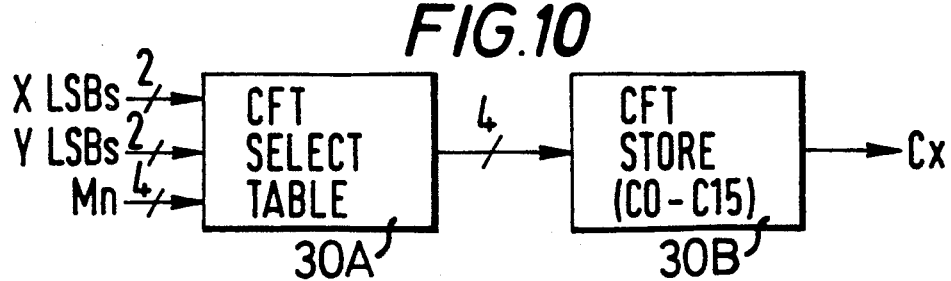
FIG. 10 shows a variant of a coefficient programmable read only memory (PROM) used in the filter of FIG. 9.

The operation of each PROM 30 can be more clearly appreciated by referring to FIG. 10, which shows one of the PROMs 30 divided into two sections, namely a coefficient selection table 30A and a coefficient store 30B. The coefficient select table 30A is a stored table of information (a look-up table) which, in response to each possible combination of the totality of bit information contained in the inputs (total of 8 bits) representing the X and Y LSBs and the memory identification (Mn), produces (and supplies to the coefficient store 30B) one of the 16 possible outputs (4 bits) identifying the position within the reading array (FIG. 7) of the pixel represented by the word being supplied from memory to the associated one of the multipliers 20, and therefore that one of the coefficients C0 to C15 that should be supplied that multiplier. The coefficient store 30B stores the sixteen coefficients C0 to C15 and is responsive to the output applied thereto by the table 30A to apply the appropriate one (Cx) of the coefficients to the associated one of the multipliers 20.

The arrangement of FIG. 10 can be considered to be a conceptual or an actual implementation of that of FIG. 9. That is to say, one can use either a single PROM 30 (for each multiplier 20), as shown in FIG. 9, or a pair of PROMs respectively constituting the coefficient select table 30A and coefficient store 30B, as shown in FIG. 10.

In the case of FIG. 9, as mentioned above, the PROMs 30 are all identical. Likewise, in the case of FIG. 10, the PROMs 30A are all identical and the PROMs 30B are all identical. This simplifies manufacture in that the number of parts to be stocked is minimised and there is a reduced chance of error resulting from the PROMs, if they differed, being installed in the wrong place on a circuit board. If, however, this advantage is not considered important, the size of the PROMs 30 (FIG. 9) and 30A (FIG. 10) can be reduced by programming therein the memory identification supplied to the third inputs, in which case each of the sixteen PROMs would be different, but each would need to receive only the X and Y LSBs. That is, the four memory identification bits, which in FIGS. 9 and 10 can be obtained by hard-wiring to appropriate input pins of the PROMs 30 and 30A, would in effect be incorporated within the PROMs by programming and therefore do not need to be supplied to the PROMs as inputs.

The filter 14 as described above is a fixed function filter in the sense that each output pixel Pout has a position that corresponds to or is identical to the position of a pixel in the stored picture. The techniques described above are, however, equally applicable to an interpolation filter, that is to say a filter which is required to produce output pixels whose positions are different to, more specifically interpolated between, pixel positions of the stored picture. Such a filter performs a weighted sum of an array of stored pixels surrounding the desired output pixel position to provide an estimate of the expected output pixel value; that is to provide resolution of a picture to sub-pixel accuracy.

Figure 11:
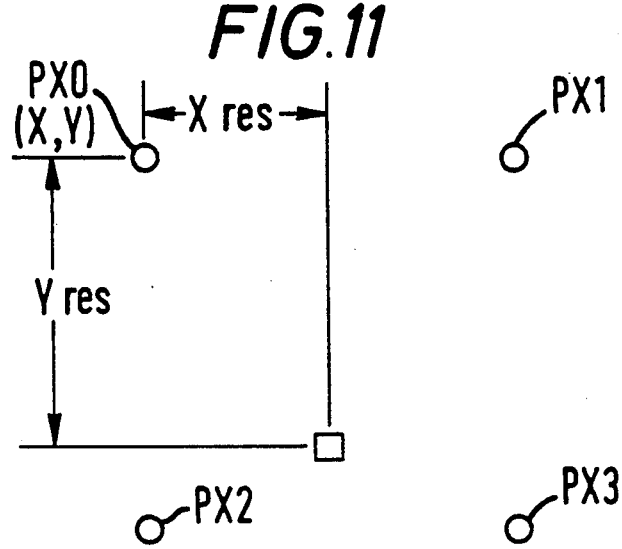
FIG. 11 shows how an interpolating filter interpolates between an array of stored words representing pixels to form an output pixel having a location which is not coincident with the location of a stored pixel.

An interpolating filter operates in substantially the same way as the filter described above, except as follows. As before, the read address comprises X and Y components identifying the location in the stored picture of a stored pixel, and these X and Y components ("the X and Y whole address") are used as before. Additionally, however, the read address generator 16 produces X and Y residuals, which represent the sub-pixel divergence (fractions of a pixel spacing) in terms of X and Y between a stored pixel location and the location desired for an interpolated output pixel. This can be comprehended more readily from an inspection of FIG. 11, in which the four circles represent the positions (more specifically the centres or sampling locations) of four stored pixels PX0, PX1, PX2 and PX3, the square represents the position of an interpolated output pixel Pout to be derived by the interpolation filter, the whole X and Y address is that of the stored pixel PX0, and the X and Y residuals are as shown at Xres and Yres, respectively. (The pixels PX0, PX1, PX2 and PX3 could be the sole four pixels of a 2×2 reading array or they could form the central pixels of a larger array of any shape or size, for instance the pixels P5, P6, P9 and P10 of the 4×4 array of FIG. 7.)

Figure 12:
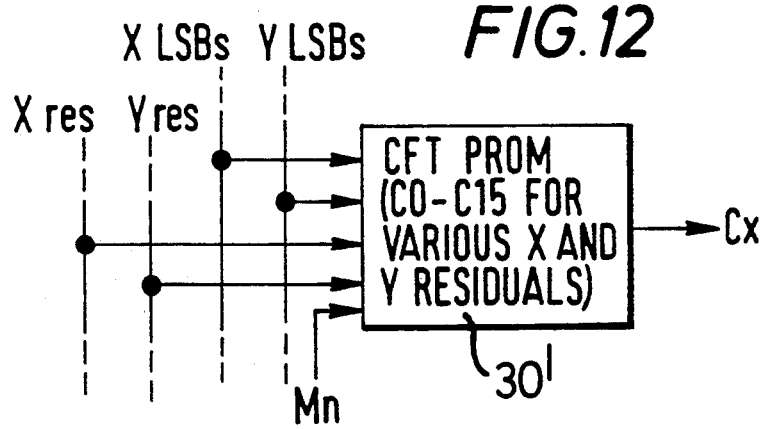
FIG. 12 shows how the PROMs of the filter of FIG. 9 can be modified when the filter is to be used as an interpolating filter.

The filters described above with reference to FIGS. 9 and 10 can readily be adapted to act as interpolating filters. In the case of FIG. 9, all of the PROMs 30 are replaced by PROMs 30' as shown in FIG. 12 and the X and Y residuals Xres and Yres are fed to all of the PROMs 30'. Each PROM 30' is the same as the PROM 30, except that it further stores information in the form of a plurality of different values of the coefficients C0 to C15 for various different values of Xres and Yres. The PROM 30' operates in the same way as the PROM 30 except that, once selection of one of the coefficients C0 to C15 to be applied to the associated multiplier 20 has been carried out, the PROM is responsive to the values of Xres and Yres applied thereto to select a particular value for the selected coefficient that is appropriate to the values of Xres and Yres.

Figure 13:
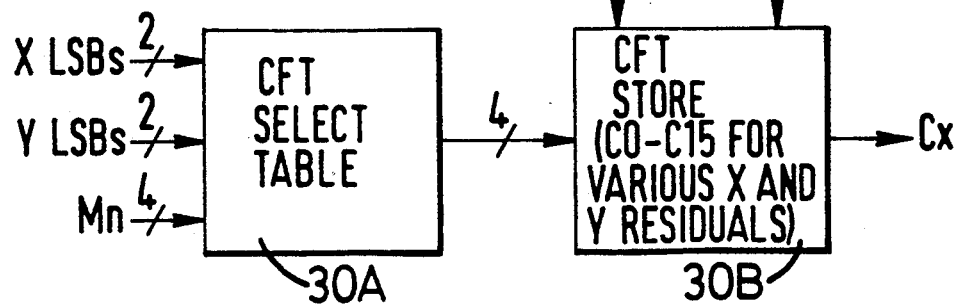
FIG. 13 shows how the PROM of FIG. 10 can be modified for use in an interpolating filter.

In similar manner, in the case of FIG. 10, while the PROMs 30A are as before, all of the PROMs 30B are replaced by PROMs 30B' as shown in FIG. 13 and the X and Y residuals Xres and Yres are fed to all of the PROMs 30B'. Each PROM 30B' is the same as the PROM 30B, except that it stores further information in the form of a plurality of different values of the coefficients C0 to C15 for various different values of Xres and Yres. The PROM 30B' operates in the same way as the PROM 30 except that, once selection of one of the coefficients C0 to C15 to be applied to the associated multiplier 20 has been carried out, the PROM is responsive to the values of Xres and Yres applied thereto to select a particular value for the selected coefficient that is appropriate to the values of Xres and Yres.

While the coefficient memories 30, 30A, 30B, 30' and 30B' mentioned above are described as being read only memories, more specifically programmable read only memories, they could instead be random access memories (RAMs) downloaded from an external store.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A digital video signal processing apparatus comprising:

receiving means for receiving a video signal in the form of a sequence of digitized data words which each represents a respective pixel of a picture, and for supplying said digitized data words to respective data buses;

write address generator means for generating address signals and for supplying the same to respective address buses;

a plurality of memory means coupled to said respective data buses and said respective address buses, each of said memory means being operative to receive and store a plurality of said digitized data words in respective addresses;

read address generator means for producing a reference digital read address signal and a plurality of surrounding digital read address signals which together are a set of digital read address signals identifying the positions along two orthogonal coordinate directions of a set of stored digitized words which represent a set of pixels constituting at least some of the pixels of a two-dimensional portion of said picture, each of said digital read address signals including at least one significant bit for each of said coordinate directions, the values of the least significant bits indicating the respective memory means in which the respective digitized words are stored, and for simultaneously supplying said digital read address signals of said set of stored digitized words which represent said set of pixels to respective address buses for reading said set of stored digitized words from said plurality of memory means; and digital filter means having a plurality of multipliers equal in number to the number of said digitized words in said set of stored digitized words, each of said multipliers being connected to a respective one of said memory means by one of the respective data buses so as to receive a respective one of the set of stored digitized words read therefrom, a plurality of coefficient memories each connected to a respective one of said multipliers, each of said coefficient memories storing a plurality of weighting coefficients which are each associated with the position of a respective one of said set of pixels in said two-dimensional portion of said picture and means for supplying to each of said coefficient memories a characteristic identification signal characteristic of said memory means whose respective data bus is connected to said respective one of said multipliers to which the coefficient memory is also connected, each of said coefficient memories being responsive to the values of the least significant bits of said reference digital read address signal and to the characteristic identification signal supplied thereto to supply to said respective multiplier that one of said plurality of weighing coefficients which is associated with the position of the pixel in said two-dimensional portion of said picture represented by the word supplied to said respective multiplier.

2. Apparatus according to claim 1, wherein said set of pixels is a two-dimensional section of said picture which lies within said two-dimensional portion of said picture.

3. Apparatus according to claim 1, wherein said set of pixels includes all of the pixels of said two-dimensional portion of said picture.

4. A digital video signal processing apparatus comprising:

receiving means for receiving a video signal in the form of a sequence of digitized data words which each represents a respective pixel of a picture, and for supplying said digitized data words to respective data buses;

write address generator means for generating address signals and for supplying the same to respective address buses;

a plurality of memory means coupled to said respective data buses and said respective address buses, each of said memory means being operative to receive and store a plurality of said digitized data words in respective addresses;

read address generator means for producing a reference digital read address signal and a plurality of surrounding digital read address signals which together are a set of digital read address signals identifying the positions along two orthogonal coordinate directions of a set of stored digitized words which represent a set of pixels constituting at least some of the pixels of a two-dimensional portion of said picture, each of said digital read address signals including at least one significant bit for each of said coordinate directions, the values of the least significant bits indicating the memory means in which the respective digitized words are stored, and for supplying said digital read address signals of said set of stored digitized words which represent said set of pixels to respective address buses for reading said set of stored digitized words from said plurality of memory means; and digital filter means having a plurality of multipliers equal in number to the number of said digitized words in said set of stored digitized words, each of said multipliers being connected to a respective one of said memory means by one of the respective data buses so as to receive a respective one of the set of stored digitized words read therefrom, a plurality of coefficient memories which are substantially identical and are each connected to a respective one of said multipliers, each of said coefficient memories storing a plurality of weighing coefficients which are each associated with the position of a respective one of said pixels in said two-dimensional portion of said picture and means for supplying to each of said coefficient memories a characteristic identification signal characteristic of said memory means whose respective data bus is connected to said respective one of said multipliers to which the coefficient memory is also connected, each of said coefficient memories being responsive to the values of the least significant bits of said reference digital read address signal and to the characteristic identification signal supplied thereto to supply to said respective multiplier that one of said plurality of weighing coefficients which is associated with the position of the pixel in said two-dimensional portion of said picture represented by the word supplied to said respective multiplier.

5. Apparatus according to claim 1, wherein each of said coefficient memories has stored therein the identity of the memory means whose data bus is connected to said respective multiplier.

6. Apparatus according to claim 1, wherein each of said coefficient memories includes a read only memory.

7. Apparatus according to claim 6, wherein each of the read only memories is a programmable read only memory.

8. Apparatus according to claim 1, wherein said digital filter means is an interpolating filter, said read address generator means further produces residuals representing sub-pixel spacing in both of said coordinate directions between a stored pixel location and a location desired for an interpolated output pixel, and each of said coefficient memories stores a plurality of different values of each of said weighting coefficients for respective different values of said residuals and is responsive to the values of said residuals produced by said read address generator means to select an appropriate weighting coefficient value.

9. A digital video signal processing apparatus comprising:

receiving means for receiving a video signal in the form of a sequence of digitized data words which each represents a respective pixel of a picture, and for supplying said digitized data words to respective data buses;

write address generator means for generating address signals and for supplying the same to respective address buses;

a plurality of memory means each identified by a respective identification signal and each coupled to said respective data buses and said respective address buses, each of said memory means being operative to receive and store a plurality of said digitized data words in respective addresses;

read address generator means for producing a digital read address signal, said read address signal identifying the position along two-orthogonal coordinate directions of a set of the stored digitized words which are to be read from respective ones of said memory means, said digitized words of said set of stored digitized words representing a set of pixels which constitute at least some of the pixels of a two-dimensional portion of said picture, said read address signal including at least one least significant bit for each of said coordinate directions, the values of the least significant bits indicating the respective memory means in which the digitized words to be read are stored; and digital filter means having a plurality of multipliers equal in number to the number of said digitized words in said set of said digitized words, each of said multipliers being connected to a respective one of said memory means by the respective data bus so as to receive a respective one of the set of words which are read therefrom, a plurality of coefficient memories each including a first read only memory for storing a table of the relationship between (i) the different values of said least significant bits and the identity of said memory means whose respective data bus is connected to said respective multiplier and (ii) the associated weighing coefficient, and a second read only memory for storing said plurality of weighing coefficients in which each of the second read only memories are connected to a respective one of said multipliers, said plurality of weighing coefficient are each associated with the position of a respective one of said set of pixels in said two-dimensional portion of said picture means for respectively supplying said respective identification signal of each of said memory means to each of the first read only memories of said coefficient memories, each of said first read only memories of said coefficient memories being responsive to the values of said least significant bits and to the characteristic identification signal of said memory means whose respective data bus is connected to the respective multiplier to cause the respective second read only memory to supply to said respective multiplier that one of said plurality of weighing coefficients which is associated with the position of the pixel in said two-dimensional portion of said picture represented by the word supplied to said respective multiplier.

* * * * *